(12) United States Patent
Sung et al.

(10) Patent No.: US 8,808,483 B2
(45) Date of Patent: Aug. 19, 2014

(54) METHOD OF MAKING A CURVED TOUCH PANEL

(75) Inventors: Kuo-Hua Sung, Sunnyvale, CA (US); Casey J. Feinstein, San Jose, CA (US); Silvio Grespan, Shanghai (CN)

(73) Assignee: Apple Inc., Cupertino, CA (US)

( * ) Notice: Subject to any disclaimer, the term of this patent is extended or adjusted under 35 U.S.C. 154(b) by 587 days.

(21) Appl. No.: 12/940,500

(22) Filed: Nov. 5, 2010

(65) Prior Publication Data

US 2012/0111479 A1    May 10, 2012

(51) Int. Cl.
*B32B 37/18*    (2006.01)

(52) U.S. Cl.
USPC .......................................... 156/214; 156/228

(58) Field of Classification Search
None
See application file for complete search history.

(56) References Cited

U.S. PATENT DOCUMENTS

| | | |
|---|---|---|
| 2,606,853 A | 8/1952 | Reese et al. |
| 3,846,221 A | 11/1974 | Golec |
| 4,564,408 A | 1/1986 | Crumbach et al. |
| 4,927,479 A | 5/1990 | Bock |
| 5,250,146 A | 10/1993 | Horvath |
| 5,483,261 A | 1/1996 | Yasutake |
| 5,488,204 A | 1/1996 | Mead et al. |
| 5,494,546 A | 2/1996 | Horvath |
| 5,733,410 A | 3/1998 | Gore et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,311,399 B1 | 11/2001 | Steelman et al. |
| 6,323,846 B1 | 11/2001 | Westerman et al. |
| 6,690,387 B2 | 2/2004 | Zimmerman et al. |
| 6,706,403 B1 | 3/2004 | Olofson et al. |
| 6,841,027 B2 | 1/2005 | Muffler |
| 7,015,894 B2 | 3/2006 | Morohoshi |
| 7,144,464 B2 | 12/2006 | Teschner et al. |

(Continued)

FOREIGN PATENT DOCUMENTS

| | | |
|---|---|---|
| DE | 100 52 293 A1 | 4/2002 |
| EP | 1 479 515 A2 | 11/2004 |

(Continued)

OTHER PUBLICATIONS

Final Office Action mailed Dec. 17, 2010, for U.S. Appl. No. 12/237,281, 13 pages.

(Continued)

*Primary Examiner* — Barbara J Musser
(74) *Attorney, Agent, or Firm* — David C. Kellogg (57) ABSTRACT

A method of forming a curved touch surface is disclosed. According to an embodiment, the method includes depositing a touch sensor pattern on a flexible substrate; and curving the flexible substrate, using a chuck surface supporting the flexible substrate, to conform to a shape of a curved cover surface. Then, the curved flexible substrate can be laminated or otherwise adhered to the cover surface. The flexible substrate can be a glass substrate greater than 200 μm in thickness, and can be reduced to a desired thickness below 200 μm after the touch sensor pattern is deposited thereon. The flexible substrate can be curved by supporting the flexible substrate on the chuck surface such that the flexible substrate conforms to a shape of the chuck surface, or forcing the flexible substrate against the cover surface, such that the flexible substrate conforms to the shape of the curved cover surface.

12 Claims, 7 Drawing Sheets

(56) References Cited

U.S. PATENT DOCUMENTS

| | | | |
|---|---|---|---|
| 7,184,064 | B2 | 2/2007 | Zimmerman et al. |
| 7,306,690 | B2 | 12/2007 | Hodsdon et al. |
| 7,663,607 | B2 | 2/2010 | Hotelling et al. |
| 8,123,894 | B2 | 2/2012 | Sung et al. |
| 8,196,636 | B2 | 6/2012 | Sung et al. |
| 2002/0062921 | A1 | 5/2002 | Muffler |
| 2004/0154730 | A1 | 8/2004 | Clingman et al. |
| 2004/0231778 | A1 | 11/2004 | Teschner et al. |
| 2005/0118922 | A1* | 6/2005 | Endo ............................ 445/24 |
| 2005/0126831 | A1* | 6/2005 | Richter et al. ............. 178/18.01 |
| 2005/0250870 | A1 | 11/2005 | Jallouli |
| 2006/0009251 | A1* | 1/2006 | Noda et al. ................. 455/550.1 |
| 2006/0026521 | A1 | 2/2006 | Hotelling et al. |
| 2006/0197753 | A1 | 9/2006 | Hotelling |
| 2009/0273570 | A1* | 11/2009 | Degner et al. ................. 345/173 |
| 2009/0277578 | A1 | 11/2009 | Sung et al. |
| 2011/0146893 | A1* | 6/2011 | Marty et al. .................. 156/212 |
| 2012/0211148 | A1 | 8/2012 | Sung et al. |
| 2012/0242588 | A1 | 9/2012 | Myers et al. |
| 2012/0243151 | A1 | 9/2012 | Lynch |

FOREIGN PATENT DOCUMENTS

| | | | |
|---|---|---|---|
| EP | 1 479 515 | A3 | 11/2004 |
| FR | 2902105 | A1 * | 12/2007 |
| JP | 2000-163031 | A | 6/2000 |
| JP | 2002-342033 | A | 11/2002 |
| WO | WO-2009/137290 | A2 | 11/2009 |
| WO | WO-2009/137290 | A3 | 11/2009 |

OTHER PUBLICATIONS

Final Office Action mailed Apr. 15, 2011, for U.S. Appl. No. 12/842,905, nine pages.

International Search Report mailed Dec. 3, 2009, for PCT Application No. PCT/US2009/041850, filed Apr. 27, 2009, five pages.

Non-Final Office Action mailed Sep. 21, 2010, for U.S. Appl. No. 12/237,281, nine pages.

Non-Final Office Action mailed Dec. 21, 2010, for U.S. Appl. No. 12/842,905, 11 pages.

Non-Final Office Action mailed Mar. 30, 2011, for U.S. Appl. No. 12/237,281, filed Sep. 24, 2008, 12 pages.

Non-Final Office Action mailed Aug. 17, 2011, for U.S. Appl. No. 12/842,905, 11 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Notice of Allowance mailed Mar. 1, 2012, for U.S. Appl. No. 12/842,905, seven pages.

* cited by examiner

METHOD OF MAKING A CURVED TOUCH PANEL

FIELD

This relates generally to the formation of touch panels, and in particular, to forming a curved touch panel having at least one touch sensor formed using thin flexible substrates.

BACKGROUND

Recently, input devices utilizing touch sensors, such as track pads, touch screens and the like, have become increasingly popular. In portable computing devices such as laptop computers, the input devices are commonly track pads (also known as touch pads). With a track pad, the movement of an input pointer (i.e., cursor) usually corresponds to the relative movements of the user's finger (or stylus) as the finger is moved along a surface of the track pad.

In the case of hand-held personal digital assistants (PDA) or mobile devices, the input devices tend to utilize touch-sensitive display screens. When using a touch screen, a user can make a selection on the display screen by pointing directly to objects on the screen using a stylus or finger. Touch screens can include a touch sensor panel, which can be a clear panel with a touch-sensitive surface, and a display device such as a liquid crystal display (LCD) that can be positioned partially or fully behind the panel, or integrated with the panel, so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Depending on design specifications, touch sensor panels can be formed in a variety of shapes and curvatures. However, in the case of a touch screen, for example, a transparent substrate (e.g., glass) can include a thin transparent patterned film, for example, laminated (or otherwise deposited or formed) thereon. Because of the desired thinness of the substrate and thin film, difficulties can occur during fabrication due to the risk of damaging components of the touch sensor panel. For example, conventional lamination processes are adequate for laminating a substantially flat/planar substrate to a substantially flat/planar material. However, conventional techniques may not be useable when a flexible glass substrate is to be laminated to a curved cover surface, for example, due to the risk of damaging the substrate and/or cover surface.

SUMMARY

Presently disclosed embodiments are directed to solving issues relating to one or more of the problems presented in the prior art, as well as providing additional features that will become readily apparent by reference to the following detailed description when taken in conjunction with the accompanying drawings.

Embodiments described herein relate to the formation of curved touch surfaces having curved substrates. According to an embodiment, the curved substrate can be a thin glass substrate less than 200 μm in thickness.

Embodiments described herein are directed to a method of forming a curved touch surface including depositing a touch sensor pattern on a flexible substrate, and curving the flexible substrate to conform to a shape of a curved cover surface. The flexible substrate can be curved by supporting the flexible substrate on the chuck surface such that the flexible substrate conforms to a shape of the chuck surface, or forcing the flexible substrate against the cover surface, such that the flexible substrate conforms to the shape of the curved cover surface.

According to an embodiment, a method of forming a curved touch surface can include forming one or more touch sensors on a flexible substrate oriented in a flat configuration. Then, the flexible substrate can be molded to conform to a curved cover surface, and adhered to the curved cover surface.

The flexible substrate can be a glass substrate greater than 200 μm in thickness, and can be reduced to a desired thickness below 200 μm, for example, after the touch sensor pattern is deposited thereon. Thereafter, the curved flexible substrate can be laminated, or otherwise adhered, to the cover surface.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates to the formation of curved touch surfaces having curved substrates. According to an embodiment, the curved substrate can be a thin glass substrate less than 200 μm in thickness. Embodiments described herein are directed to a method of forming a curved touch surface including depositing a touch sensor pattern on a flexible substrate, and curving the flexible substrate to conform to a shape of a curved cover surface. In order to curve the flexible substrate, according to one embodiment, the flexible substrate can be supported on a chuck surface, such that the flexible substrate can conform to a shape of the chuck surface, which can have a substantially similar shape to the shape of the cover surface. As an alternative (or in addition), the flexible substrate can be forced against the curve cover surface so that the flexible substrate can conform to the shape of the cover surface. Thereafter, the curved flexible substrate can be laminated to the cover surface.

Figure 1:
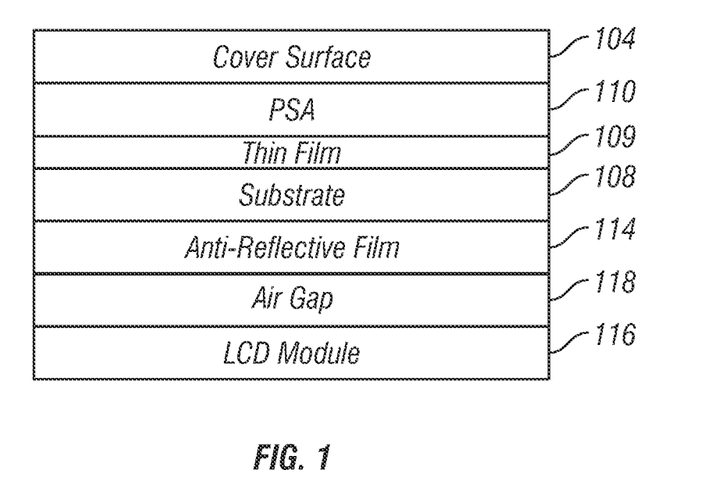
FIG. 1 illustrates an exemplary touch sensor panel stackup, according to one embodiment described herein.

FIG. 1 illustrates an exemplary touch screen stackup, including a touch sensor panel with drive and sense electrodes formed with a thin film layer deposited on substrate, according to various embodiments. Touch surfaces, such as capacitive sensing surfaces, generally contain several layers of material. For example, the capacitive sensing surface can include a protective/cosmetic shield (e.g., a cover glass 104 or other dielectric material), one or more electrode layers and a substrate 108. The protective shield (e.g., cover surface 104) is the part of the capacitive sensing surface that can be touched by the user to perform functions such as control operations, gestures, or cursor movements on a display screen, for example. According to various embodiments, the cover surface can be glass or plastic, for example. The cover surface can cover the electrode layer(s), and the electrode layer(s) can be formed on the substrate 108 by depositing thin film 109 thereon. According to embodiments described herein, the substrate 108 can be a glass substrate or plastic substrate, for example, with a thickness less than 200 μm.

Capacitive sensing surfaces as described herein can refer to a track pad, touch mouse, touch screen, or any other touch-sensitive surface. For exemplary purposes, various embodiments are described with reference to a touch sensor incorporated within a touch screen. It is noted, however, that the processes described herein can be implemented for various other devices equipped with one or more touch sensors.

In the case of the touch sensor being incorporated within a touch screen, the thin film material used to form the drive and sense electrodes can be a substantially transparent conductive material, such as Indium Tin Oxide (ITO) or Antimony Tin Oxide (ATO), for example. However, the thin film 109 can be any other transparent or non-transparent conductive materials, such as silver ink, copper, $SiO_2$, or the like. Thin film 109 can be laminated to substrate 108, or the ITO can be deposited using a sputtering process, a lithography etch, or any other deposition technique.

Thin film 109 can include one or more electrode layers having a matrix of drive and sense electrodes of a conductive material. Drive signals can be transmitted through the drive electrodes, resulting in signal (mutual) capacitances between the drive and sense electrodes at the intersection (touch pixels) of the drive electrodes and the sense electrodes. Sensing electronics can be adapted to detect the change in capacitance at each of the sense electrodes as a finger or other object passes over or contacts the touch surface. The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge present at the touch pixels being touched, which is a function of Csig. The resulting change in signal capacitance is recognized by the sensing electronics to indicate that a finger or other object has contacted (or is in proximity to) the touch surface at a known pixel.

The sensing electronics can include an application specific integrated circuit (ASIC) that can be configured to detect a change in capacitance at each of the electrodes and to compute the position of finger movement based on the change in capacitance over time at each of the sense electrodes. The ASIC can also be configured to report this information to other logic within the computing device, such as a host processor.

Substrate 108 of the type described above, with a thin film 109 forming patterned drive electrodes and sense electrodes, can be bonded to the cover surface 104 with pressure sensitive adhesive (PSA) 110. It is noted that PSA 110 is used in the depicted embodiment for exemplary purposes. Alternatively, re-workable PSAs, thermoplastic film, thermoset film, thermal cure liquid (single or multiple components), ultraviolet (UV) cure liquid, and multiple-component adhesives that cure at room temperature can be used. The adhesive can be applied to the substrate 108, cover surface 104 or both.

An unpatterned layer of ITO (not shown) can optionally be formed on the bottom of the substrate 108 to act as a shield. Anti-reflective (AR) film 114 can then be deposited over the unpatterned ITO. LCD module 116 can be placed beneath the substrate 108, optionally separated by air gap 118 for ease of repair. Of course, various combinations of the layers of materials depicted in FIG. 1, or completely different layers, can be used without departing from the scope of the present disclosure. Also, the thin film 109 can be formed and patterned below the substrate 108, or on both sides, according to various embodiments.

Figure 2A:
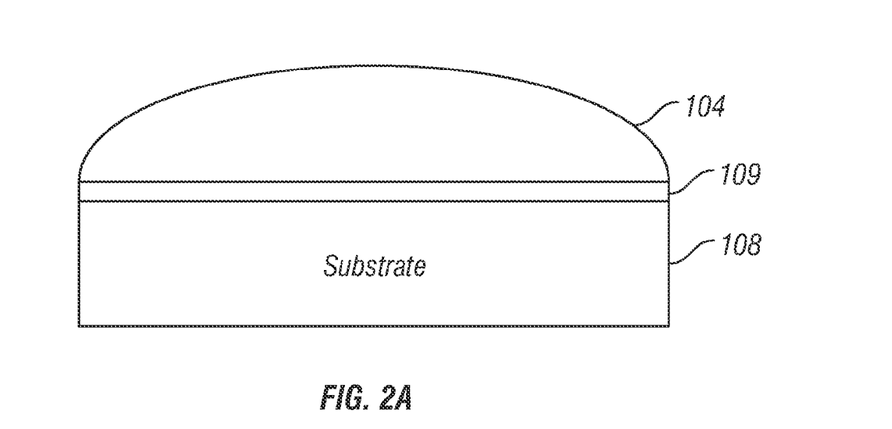
FIG. 2A illustrates a touch sensor panel with a curved cover surface, according to one embodiment described herein.

Depending on design preferences, touch sensor panels can take various shapes and/or curvatures. For example, touch sensor panels can have a convex or concave curvature along either the x or y axis, or both axes, or can be completely spherical. FIG. 2A shows an exemplary stackup, including (for simplicity) substrate 108, thin film 109 and cover surface 104 (e.g., glass or plastic), where the cover surface is curved along at least one axis. Accordingly, the touch sensor can have a visual effect of being convex with respect to the user. Since the substrate remains flat in the convex design of FIG. 2A, the overall thickness of the touch sensor panel can be greater than if the cover surface 104 is also flat, as shown in FIG. 1. Moreover, capacitive sensing at the sense electrodes formed with thin film 109 can be degraded, due to the greater distance between a user's finger contacting the cover surface 104, for example, and the drive and sense electrodes (i.e., the greater distance between cover surface 104 and thin film 109).

Figure 2B:
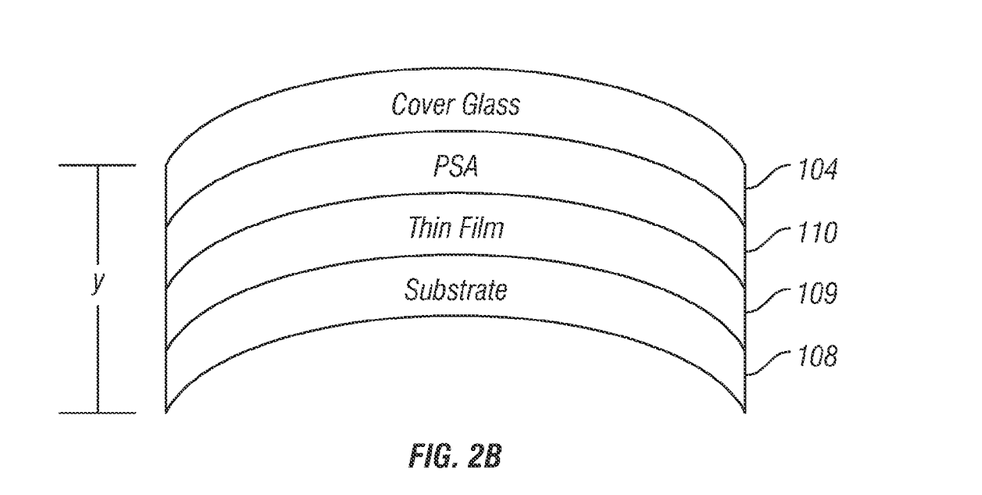
FIG. 2B illustrates a constant wall touch sensor panel, according to one embodiment described herein.

FIG. 2B illustrates a constant wall touch sensor panel, according to one embodiment described herein. According to FIG. 2B, the thickness "y" of the touch sensor panel can remain constant, since the substrate 108 is curved to a substantially similar degree as the cover surface 104. Using the constant wall design as shown in FIG. 2B, the overall thickness of the touch sensor panel can be less than the design shown in FIG. 2A, while touch sensitivity can remain high, since the distance between cover surface 104 and thin film 109 is unchanged from that of the completely flat stackup of FIG. 1, for example. In addition, visual distortion of the display, due to the curved cover surface can be reduced. That is, the amount of cover material to see through in the middle of the display is greater than at the edges, which can result in distortions.

Moreover, the overall weight of the touch sensor panel can be reduced, since less material can be required for the cover surface 104. As yet another advantage, the curved substrate 108 leaves available real estate beneath the touch sensor panel for other components of a computing system or device to which the touch sensor panel can be communicatively coupled. However, to achieve these advantages, it can be desirable to form the touch sensor with a curved substrate 108.

As noted above, the curved substrate 108 can be glass (or other transparent material such as plastic), when used within a touch screen, for example, to provide transparency. However, due to the dimensional requirements of the touch sensor, a substrate 108 can be required to be very thin (e.g., between 50 and 150 µm). Curving such thin substrate material to conform to a shape of a curved cover surface 104 can cause the substrate to crack.

Figure 3A:
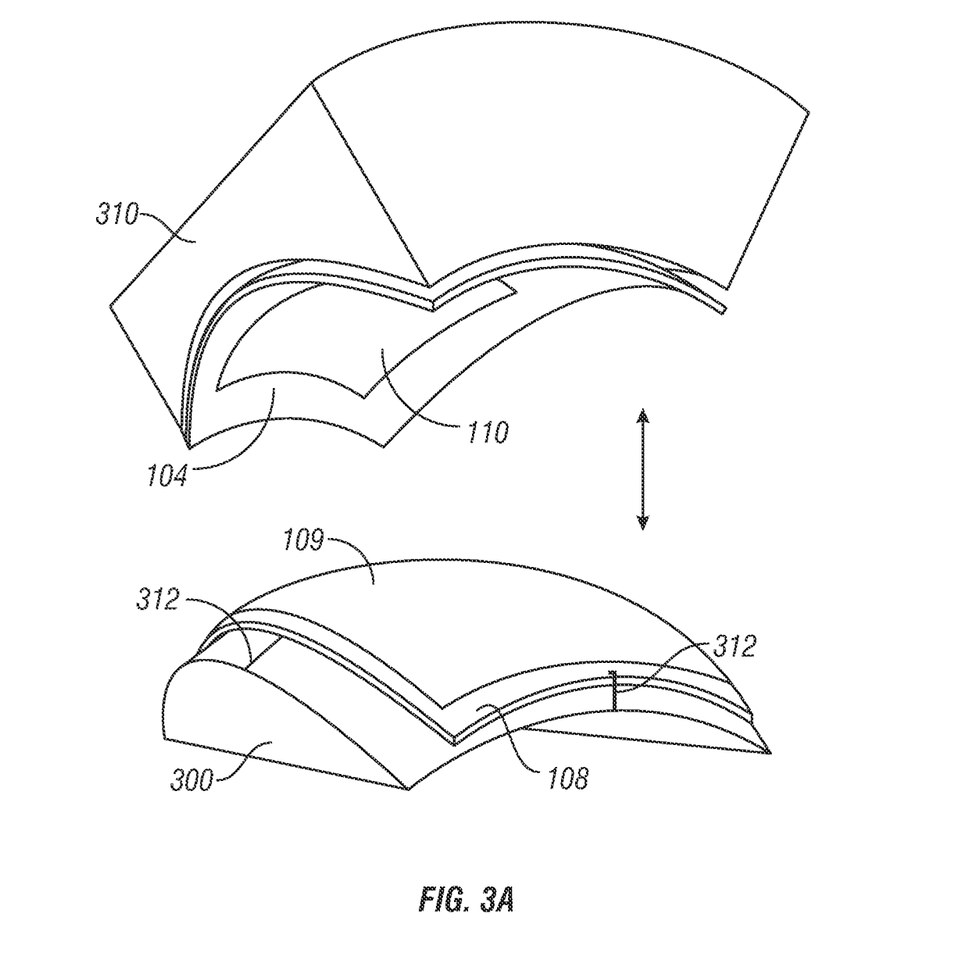
FIGS. 3A-3D illustrates an exemplary process of forming a touch sensor with a flexible substrate and a curved cover surface, according to various embodiments described herein.

FIG. 3A shows an exemplary system for curving and laminating the flexible substrate 108 to the cover surface 104, according to one embodiment of the present disclosure. In the exemplary embodiment depicted in FIG. 3A, the flexible substrate 108 can be curved to conform to the shape of the cover surface 104 by the chuck surface 300. For exemplary purposes, the curved cover surface 104 is curved along two axes; however, a cover surface having various curvatures, to various degrees, along one or more axes can be similarly employed.

As shown in FIG. 3A, flexible substrate 108 includes a thin film 109. Thin film 109 can be deposited (e.g., laminated) to substrate 108. Thin film 109 can be patterned to form the touch sensor pattern of drive and sense electrodes, as described above. According to one embodiment, the processing of thin film 109 can occur while substrate 108 is flat, and resting (or otherwise attached) to flat surface. According to various embodiments, the flexible substrate 108 can be relatively thick (e.g., greater than 200 µm) while the thin film is deposited therein. Thereafter, the flexible substrate 108 can be thinned by machining the flexible glass substrate to a desired thickness (e.g., below 200 µm) using a variety of known techniques, without departing from the scope of the present disclosure.

According to the embodiment depicted in FIG. 3A, flexible substrate 108 can be supported on chuck surface 300, which can be any rigid surface, such as plastic or glass for example. Flexible substrate 108 can be secured to chuck surface 300 with vacuum suction or mechanically held in place with fasteners 312, according to one embodiment. Of course, various other techniques for securing the flexible substrate 108 to the chuck surface 300 can be employed, such as static electricity, temporary lamination, and the like. According to one embodiment, chuck surface 300 can be shaped in a substantially similar shape as preformed cover surface 104, which can be held by chuck 310, for example. In this case, flexible substrate 108 can conform to the curvature of chuck surface 300, which in turn can cause flexible substrate 108 to conform to cover surface 104.

When chucks 300 and 310 are brought together, flexible substrate 108 can adhere to cover surface 104, using PSA 110, for example, which is pre-deposited on cover surface 104, according to one exemplary embodiment. As noted above, any adhesive can be used, such as re-workable PSAs, thermoplastic film, thermoset film, thermal cure liquid (single or multiple components), UV cure liquid, multiple-component adhesives that cure at room temperature, and double-sided tape. Further, the adhesive can be pre-deposited on flexible surface 108 in addition to, or instead of, cover surface 104.

It is important to note that fasteners 312 can be thinner (e.g., ~150 µm) than the thickness of PSA 110 (e.g., ~200 µm), according to an embodiment, since chuck surface 300 must press the flexible substrate 108 against cover surface 104 (including PSA 110) so that flexible surface 108 adheres to cover surface 104. If the fasteners 312 were thicker than the PSA 110, the flexible substrate 108 may be unable to be pressed against cover surface 104.

Figure 3B:
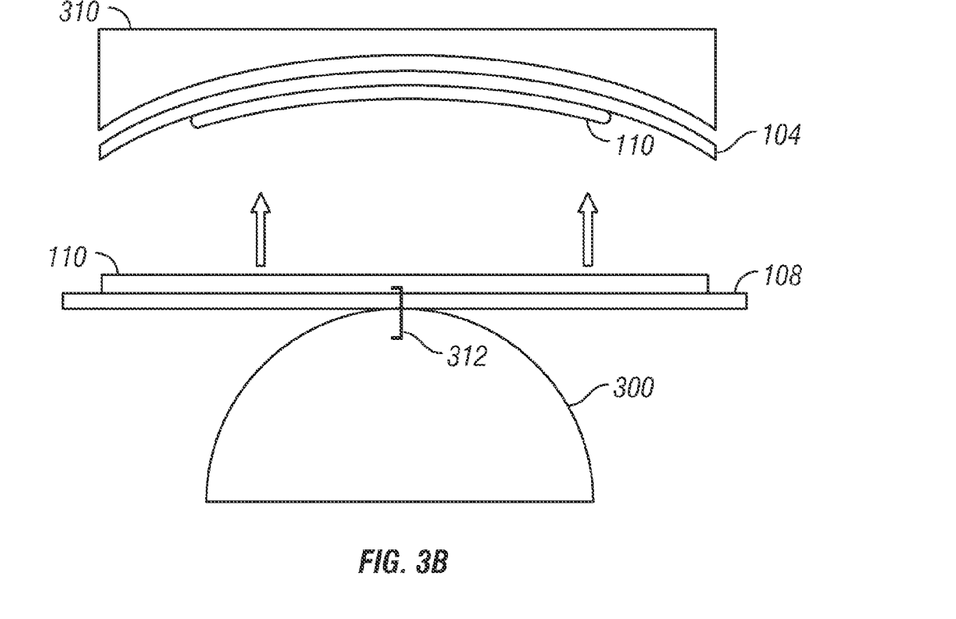

FIG. 3B shows an exemplary system for curving and laminating the flexible substrate 108 to the cover surface 104, according to one embodiment. According to the embodiment depicted in FIG. 3B, it is not necessary for the chuck surface 300 to be shaped to the exact curvature of the cover surface 104.

Similarly to FIG. 3A, as shown in FIG. 3B, flexible glass substrate 108 can include a thin film 109 (see FIG. 3A) patterned with touch sensor circuitry, which is not depicted in FIG. 3B for simplicity. According to the embodiment depicted in FIG. 3B, flexible substrate 108 can be supported on chuck surface 300. Flexible substrate 108 can be secured to chuck surface 300 with vacuum suction or mechanically held in place with fasteners 312, according to one embodiment. According to one embodiment, chuck surface 300 can be shaped substantially differently as compared to preformed cover surface 104, which can be held by chuck 310, for example. In this case, flexible substrate 108 can conform to the curvature of cover surface 104 when it is pressed against cover surface 104 by chuck surface 300. That is, it is not necessary for flexible substrate 108 to be curved to match the curvature of cover surface 104 before the laminating process. In the exemplary embodiment of FIG. 3B, PSA 110 is pre-deposited on flexible substrate 108 and cover surface 104; however, as noted above, one can apply adhesive to either the flexible substrate or the cover surface, or both.

Figure 3C:
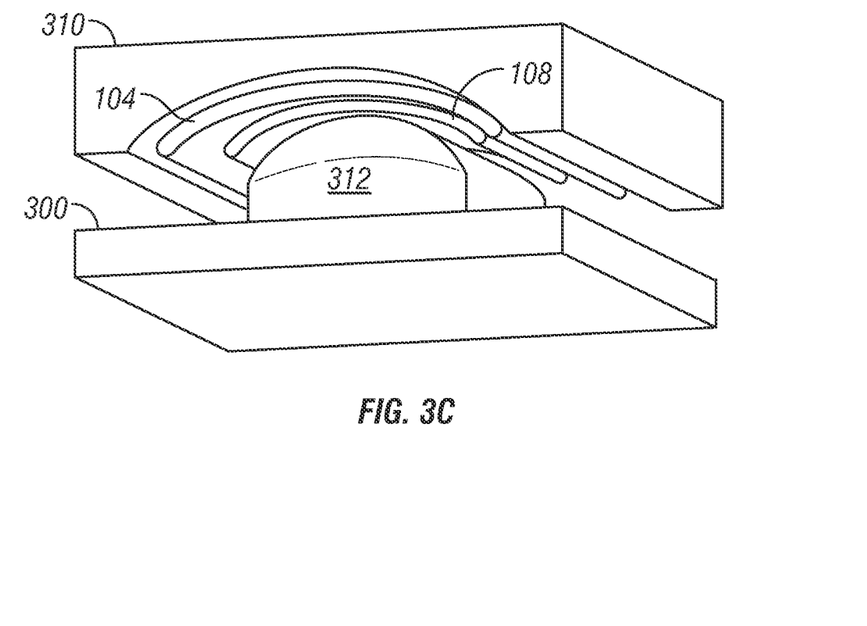

FIG. 3C shows an exemplary system for curving and laminating the flexible substrate 108 to the cover surface 104, according to one embodiment. According to the exemplary embodiment depicted in FIG. 3C, the chuck surface 300 can include a deformable surface 312 (e.g., an inflatable bladder) that can conform to the shape of the cover surface 104 when pressed against it. For simplicity, the thin film 109 and PSA 110 are not shown.

As shown in FIG. 3C, flexible substrate 108 can rest on deformable surface 312 (or can be otherwise secured using techniques described above). Deformable surface 312 be any deformable material, such as plastic or rubber, which can hold a gas or a liquid, or other conformable material such as a gel or the like.

Figure 3D:
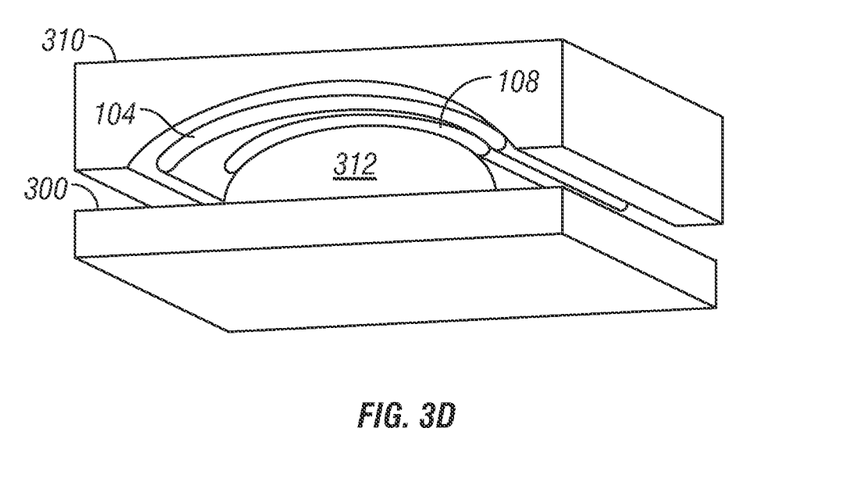

When chuck surfaces 300 and 310 are brought together, deformable surface 312 can expand due to the force of being squeezed (see FIG. 3D), such that deformable surface 312 conforms to the curvature of cover surface 104. As a result, the flexible substrate 108 can conform to the shape of cover surface 104, and adhere thereto.

Figure 4A:
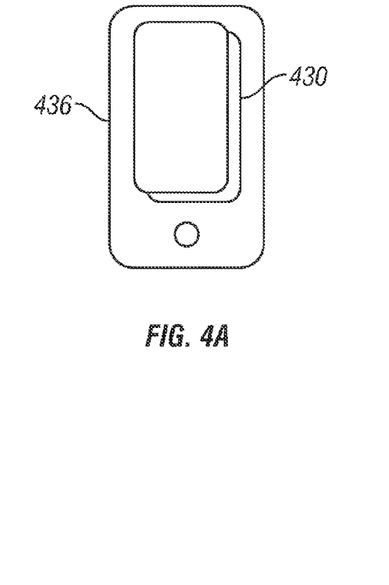
FIG. 4A illustrates an exemplary mobile telephone that can include a touch sensor with a curved substrate, according to various embodiments described herein.

FIG. 4A illustrates exemplary mobile telephone 436 including a touch screen device 430, the touch screen device 430 including a curved touch surface formed with a curved substrate, according to one disclosed embodiment.

Figure 4B:
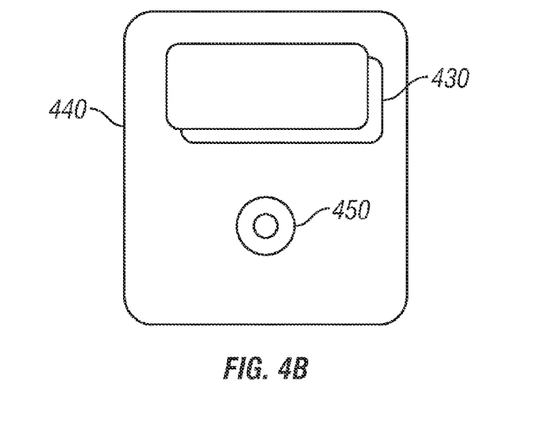
FIG. 4B illustrates an exemplary digital media player that can include a touch sensor with a curved substrate and cover surface, according to various embodiments described herein.

FIG. 4B illustrates exemplary digital media player 440 that can include a touch screen device 430 and a track pad device 450. The touch screen device 430 and/or the track pad device 450 can include a curved touch surface formed with a curved substrate, according to one disclosed embodiment.

Figure 4C:
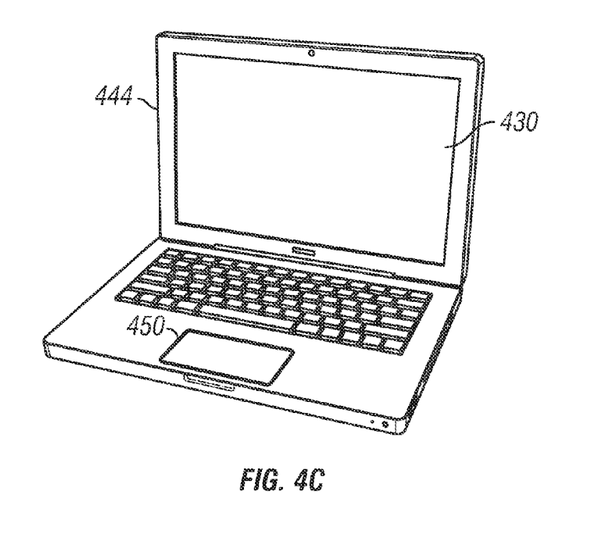
FIG. 4C illustrates exemplary personal computer that can include a touch sensor with a curved substrate and cover surface, according to various embodiments described herein.

FIG. 4C illustrates exemplary personal computer 444 that can include a display 430, and a track pad 450 including a curved touch surface formed with a curved substrate, according to one disclosed embodiment.

Figure 5:
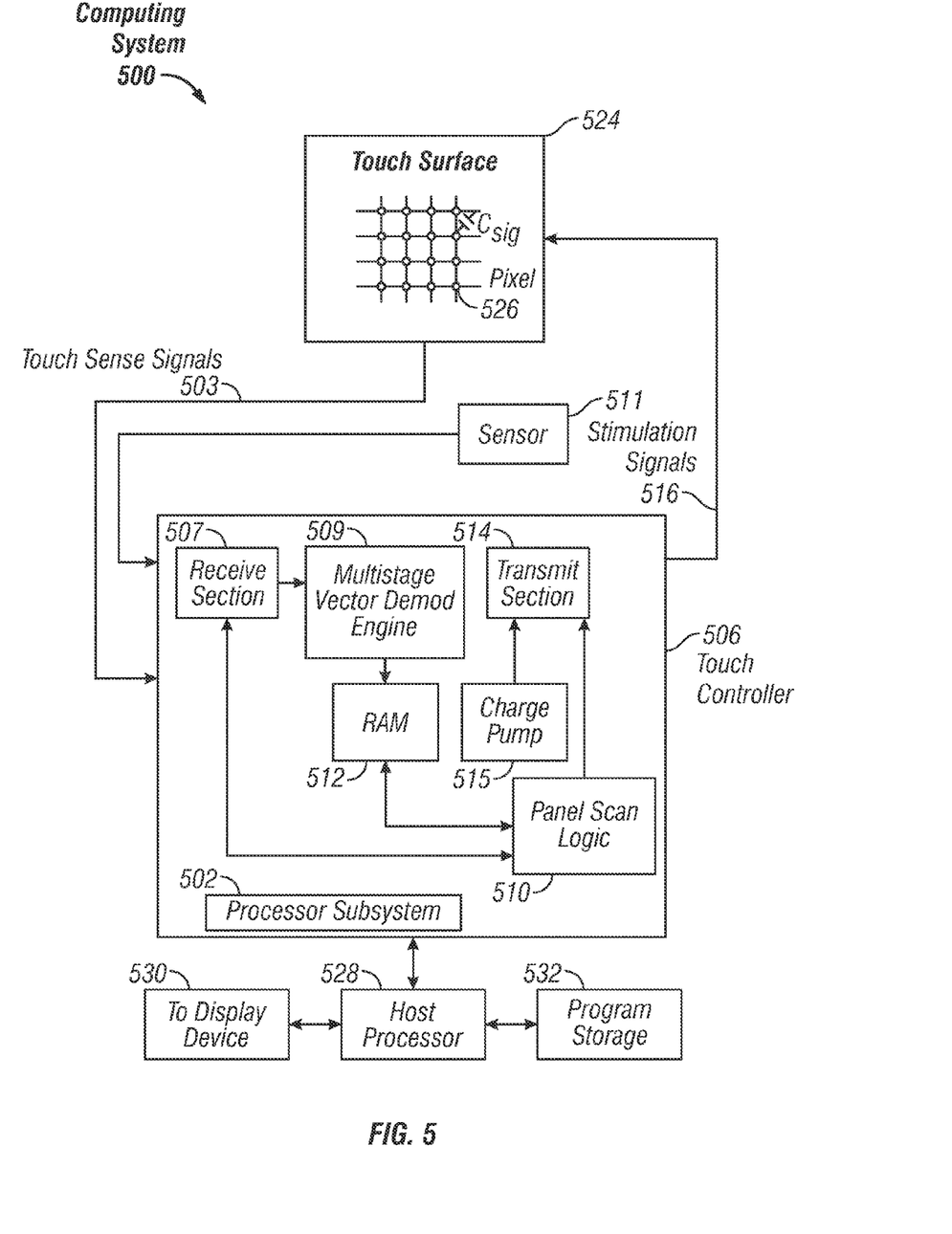
FIG. 5 illustrates an exemplary computing system including one or more touch sensors with curved substrates and cover surfaces, according to various embodiments described herein.

FIG. 5 illustrates example computing system 500 including a touch surface 524, and a touch controller 506, according to one embodiment. Any of the embodiments depicted in FIG. 4A, 4B or 4C can be realized with a similar computing system 500. Touch controller 506 can be an ASIC that can include one or more processor subsystems 502, which can include, for example, one or more main (local) processors, such as ARM968 processors or other processors with similar functionality and capabilities. However, in other embodiments, some processor functionality can be implemented instead by dedicated logic, such as a state machine. Processor subsystems 502 can also include, for example, peripherals (not shown) such as random access memory (RAM) or other types of memory or storage, watchdog timers and the like. Touch controller 506 can also include, for example, receive section 507 for receiving signals, such as touch sense signals 503 from sense electrodes (e.g., one or more columns of electrodes) of touch surface 524, and other signals from other sensors such as sensor 511, etc. Charge pump 515 can be used to generate the supply voltage for the transmit section, which can control the drive electrodes (e.g., one or more rows of electrodes). Although FIG. 5 shows charge pump 515 separate from transmit section 514, the charge pump can be part of the transmit section.

Touch controller 506 can also include, for example, a demodulation section such as multistage vector demod engine 509, panel scan logic 510, and a drive system including, for example, transmit section 514. Panel scan logic 510 can access RAM 512, autonomously read data from the sense channels and provide control for the sense channels. In addition, panel scan logic 510 can control transmit section 514 to generate stimulation signals 516 at various frequencies and phases that can be selectively applied to the drive electrodes of touch surface 524.

Touch controller 506 can be adapted to detect the change in mutual capacitance at each of the touch pixels as a finger or other object passes over or contacts the touch surface. Touch controller 506 can be configured to compute the position of finger movement based on the change in mutual capacitance at each of the touch pixels. Touch controller 506 can also be configured to report this information to other logic within touch controller 506, or host processor 528, for example. In non-capacitive embodiments, the touch controller can be adapted in accordance with the touch sensing technology to transmit or receive optical or acoustic wave communications, for example.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

What is claimed is:

1. A method of forming a curved touch surface, comprising:
   depositing a touch sensor pattern on a flexible substrate;
   curving the flexible substrate, using a chuck surface supporting the flexible substrate, to conform to a shape of a curved cover surface; and
   laminating the curved flexible substrate to an interior side of the cover surface, wherein the curving, comprises:
      supporting the flexible substrate on the chuck surface such that the flexible substrate conforms to a shape of the chuck surface, wherein the chuck surface has a shape at least partially conforming to the shape of the curved cover surface, wherein the flexible substrate is fastened to the chuck surface with a fastening unit and wherein the laminating comprises:
      applying an adhesive to at least one of the flexible substrate and the curved cover surface; and
      pressing at least of portion of the flexible substrate against the curved cover surface, wherein the fastening unit is thinner than the adhesive.

2. The method of claim 1, wherein the flexible substrate is a glass substrate less than 200 μm in thickness.

3. The method of claim 1, wherein the flexible substrate is a glass substrate greater than 200 μm in thickness, and further comprising:
   reducing the flexible glass substrate to a desired thickness after the touch sensor pattern is deposited thereon.

4. The method of claim 1, wherein the curving comprises:
   forcing the flexible substrate against the cover surface, such that the flexible substrate conforms to the shape of the curved cover surface.

5. The method of claim 1, wherein the chuck surface is included in a deformable chuck having an expandable surface conformable to the shape of the curved cover surface.

6. The method of claim 1, wherein the cover surface includes a curvature along a plurality of axes.

7. The method of claim 1, wherein the cover surface is a cover glass.

8. The method of claim 1, wherein the cover surface is plastic cover.

9. The method of claim 1, wherein the adhesive is at least one of a pressure adhesive and a liquid adhesive.

10. The method of claim 1, wherein the touch sensor pattern is formed of at least one of Indium Tin Oxide (ITO), Antimony Tin Oxide (ATO), silver ink and copper.

11. The method of claim 1, wherein the touch surface is incorporated within a computing system.

12. The method of claim 11, wherein the touch surface is incorporated within a display device.

* * * * *